(12) United States Patent
Cai et al.

(10) Patent No.: US 7,629,904 B2
(45) Date of Patent: *Dec. 8, 2009

(54) IMAGE CODING WITH SCALABLE CONTEXT QUANTIZATION

(75) Inventors: Hua Cai, Kowloon (HK); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 163 days.

This patent is subject to a terminal disclaimer.

(21) Appl. No.: 11/771,030

(22) Filed: Jun. 29, 2007

(65) Prior Publication Data

US 2007/0279265 A1    Dec. 6, 2007

Related U.S. Application Data

(63) Continuation of application No. 11/286,927, filed on Nov. 25, 2005, now Pat. No. 7,245,241.

(51) Int. Cl.
    H03M 7/00    (2006.01)
(52) U.S. Cl. .......................................... 341/107; 341/50
(58) Field of Classification Search .......... 341/107–155
    See application file for complete search history.

(56) References Cited

U.S. PATENT DOCUMENTS

| 6,792,150 | B1 | 9/2004 | Satoh |
| 7,062,101 | B2 | 6/2006 | Schwartz |
| 7,095,344 | B2 | 8/2006 | Sekiguchi et al. |
| 7,245,241 | B2 * | 7/2007 | Cai et al. ................... 341/107 |
| 2005/0238245 | A1 | 10/2005 | Yao et al. |

* cited by examiner

*Primary Examiner*—Lam T Mai
(74) *Attorney, Agent, or Firm*—Lee & Hayes, PLLC

(57) ABSTRACT

A scalable quantizer is generated from a plurality of context models for each of a plurality of bit rates used in coding a source. A context model for a lower bit rate quantizes conditioning states when there is no compression gain in coding the image using child conditioning states in the higher bit rate context model over a parent conditioning state to which they may be quantized. The scalable quantizer includes a basic context model for a lowest anticipated bit rate and enhancement bits indicating how to adapt the basic context model to derive context models for higher bit rates. For image data transformed with embedded wavelet coding, context events are selected from corresponding or neighboring pixels at different resolutions and in different bit planes, and the order of the context events is optimized to reduce conditional entropy between the context events and the current value.

20 Claims, 12 Drawing Sheets

IMAGE CODING WITH SCALABLE CONTEXT QUANTIZATION

RELATED APPLICATIONS

This is a continuation of application Ser. No. 11/286,927, filed Nov. 25, 2005, entitled "Image Coding with Scalable Context Quantization," now issued U.S. Pat. No. 7,245,241, which is hereby incorporated by reference herein.

BACKGROUND

Improving digital imaging technology allows for increasingly higher resolution and color variation in digital images. As image quality increases, however, resulting image data files increase geometrically in size. Image compression technologies strive to reduce the storage required to store image data and the bandwidth needed to transmit image data.

Image compression technologies seek to balance competing interests. On one hand, it is desirable to compress the size of a data file as much as possible so that the compressed file will consume the least amount of storage or bandwidth. On the other hand, the more a data file is compressed, the more computing resources and time are consumed in compressing the file.

FIG. 1 shows a functional block diagram of a representative encoder 100 and decoder 140 pair used to compress and decompress source data 102, respectively. For sake of example, the source data 102 includes image or video data. The encoder 100 receives the source data 102. In one embodiment, the encoder 100 first presents the source data 102 to a preprocessor 104. The preprocessor 104 separates the source data 102 into luminosity (grayscale) and chrominosity (color) components.

The output of the preprocessor 104 is presented to a transformer 106 that performs frequency transformation on the output of preprocessor 104. The transformer 106 may perform discrete wavelet transformation (DWT), discrete cosine transformation (DCT), fast Fourier transformation (FFT), or another similar frequency domain transformation on the preprocessed data. Individual data values vary less from neighboring values in transformed, frequency domain data, as compared to the spatial domain data.

Taking advantage of the less variant data values in the frequency domain data, the quantizer 108 identifies and aggregates data values having identical values, replacing a repeating series of identical data values with one instance of the data value combined with an indication of how many times the identical data value repeats. Similarly, the quantizer may combine a series of similar but not identical values with a single identical value when data values representing them with data points of equal value when the data values fall within a particular tolerance. Aggregating similar but not identical data values is used in lossy compression where some degradation of the original image is acceptable.

The output of the quantizer 108 is presented to an entropy coder 110 that generates the compressed image data 120. Generally, entropy coding compresses data by identifying or predicting the frequency with which data values occur in a data file. Then, instead of representing each data value with a fixed, equal-length value, entropy coding represents more frequently appearing data values with shorter binary representations. By replacing frequently appearing data values with shorter representations instead of fixed, equal-length representations, the resulting compressed data 120 is reduced in size.

The compressed data 120 generated by the entropy coder 110 is presented to a channel 130. The channel 130 may include data storage and/or data transmission media. A decoder 140 receives or retrieves the compressed data 120 from the channel 130 and decompresses the compressed data 120 through a mirror image of the process applied by the encoder 100. The compressed data 120 is translated by an entropy decoder 142, a dequantizer 144, an inverse transformer 146, and a postprocessor 148 that ultimately presents output data 150, such as image or video data suitable for presentation on a display or other device.

The entropy coder 110 uses a probabilistic context model to determine which values are assigned shorter and longer codes by predicting or determining which data values to appear more and less frequently, respectively. The context model includes a plurality of conditioning states used to code the data values. The context model used by the entropy encoder 110 may be a static model, developed off-line and stored both with the encoder 100 and the decoder 140. However, because the frequency with which data values may vary substantially between different data files, using a universal context model may not result in effective compression for every data file. Alternatively, a context model may be developed for each data file. The context model used by the entropy coder is stored and transmitted as part of the compressed data 120, so that the context model is available to the entropy decoder 142 to decode the compressed data 120.

Compression may be increased by using a higher order context model. A high order context model includes a large number of conditioning states for coding the data values, thus allowing for the possibility of higher coding efficiency in coding data values with the fewer bits. However, a higher order context model not only includes a large number of predicted values, but the conditioning states themselves are of a higher order. Thus, the higher the order of the context model, the more storage or bandwidth the context model consumes.

Further, if the order of the model is too high, a higher order context model may actually reduce coding efficiency. If too high an order context model is used, the coded data values may not converge sufficiently to meaningfully differentiate between data values occurring more and less frequently in the input data. This problem commonly is known as "context dilution" or "model cost," and reduces efficiency of the entropy coder.

One solution to address the content dilution problem is context quantization. Context quantization encodes values based on a selected subset of conditioning states representing data values from an area adjacent the data value being coded. Because of the complexity of finding good conditioning states and the significant overhead of representing the found conditioning states presented by the quantizer, conventional context quantizers are trained offline from a training set of data values. However, as previously described, the frequency with which data values appear in different sets of data will vary. Thus, quantizing a context model on training sets may not consistently provide effective compression.

Further complicating matters is that a context model generated or quantized for coding a source at one bit rate may not work as well for coding a source at a different bit rate. For example, a context model suitable for coding a source at a high bit rate, where more samples of the source are provided, may pose a pronounced context dilution concern when coding using a low bit rate. Different models may be created for different bit rates, but creation, storage, and/or transmission of different models for a number of different bit rates consumes processing, storage, and bandwidth resources, respectively.

SUMMARY

A scalable quantizer is generated from a plurality of context models for each of a plurality of bit rates used in coding a source. A context model for a lower bit rate quantizes conditioning states when there is no compression gain in coding the image using child conditioning states in the higher bit rate context model over a parent conditioning state to which they may be quantized. The scalable quantizer includes a basic context model for a lowest anticipated bit rate and enhancement bits indicating how to adapt the basic context model to derive context models for higher bit rates. For image data transformed with embedded wavelet coding, context events are selected from corresponding or neighboring pixels at different resolutions and in different bit planes, and the order of the context events is optimized to reduce conditional entropy between the context events and the current value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number and the two left-most digits of a four-digit reference number identify the figure in which the reference number first appears. The use of the same reference numbers in different figures indicates similar or identical items.

DETAILED DESCRIPTION

Scalable Context Quantizer for Coding a Source at Multiple Bit Rates

Figure 1:
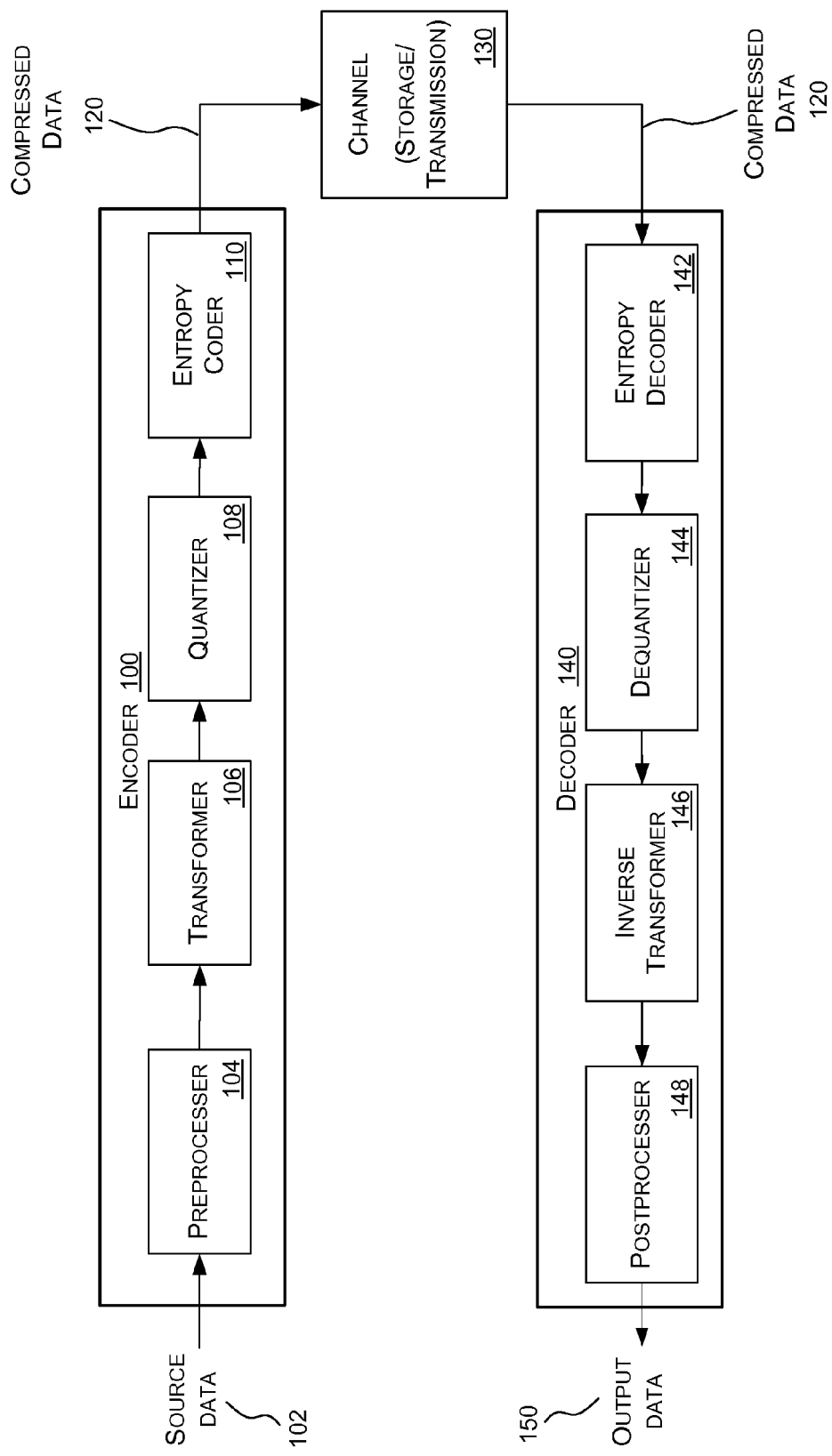
FIG. 1 (Prior Art) is a block diagram of a typical encoder and decoder pair used in image compression and decompression, respectively.
Figure 2:
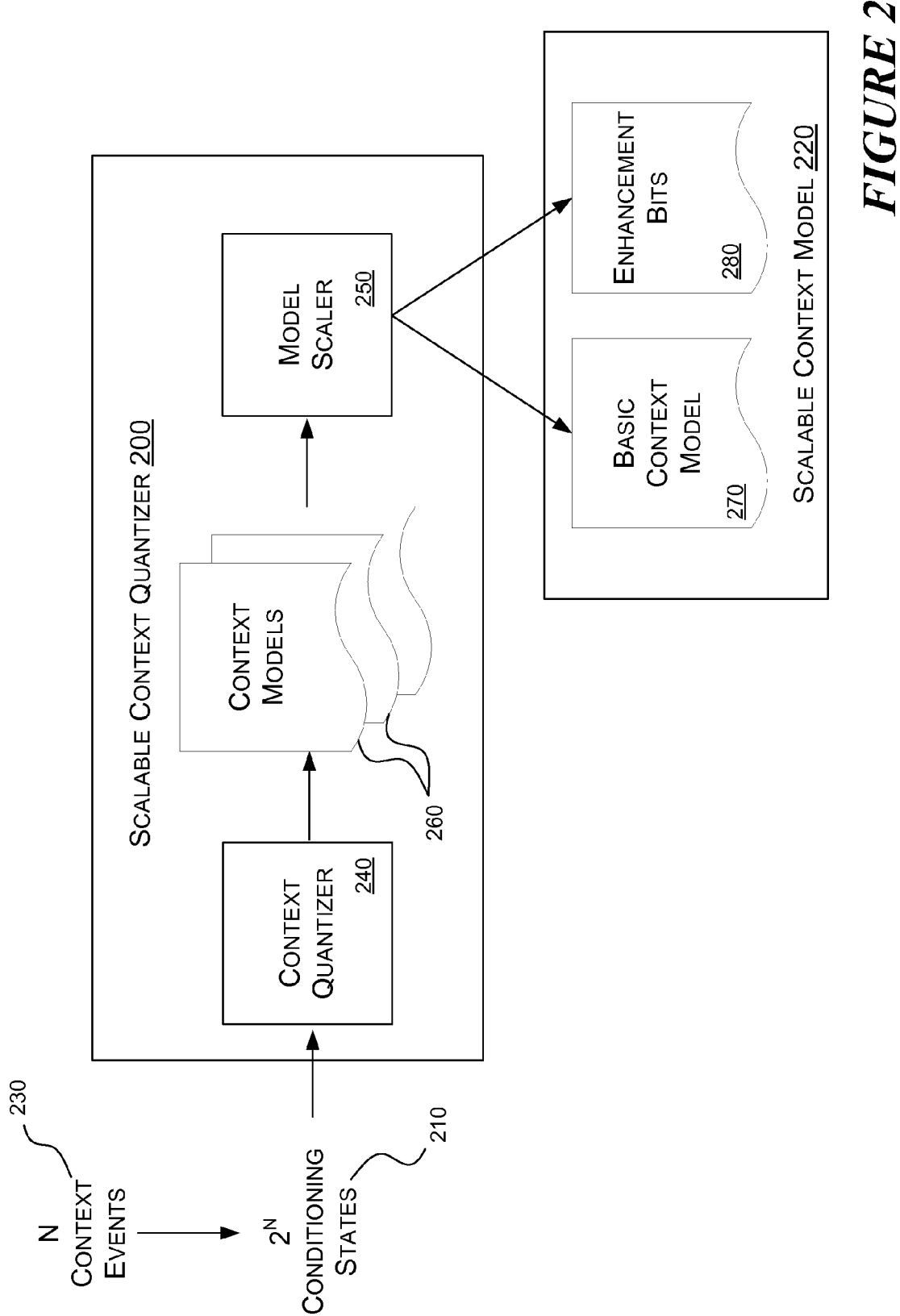
FIG. 2 is a block diagram of a scalable context quantizer for generating a scalable context model.

FIG. 2 is a block diagram illustrating an embodiment of a mode of a scalable context quantizer 200. In one mode, the scalable context quantizer 200 receives a plurality of potential conditioning states 210 and generates a scalable context model 230 that is scalable for coding sources at a plurality of bit rates.

In one exemplary mode described in detail herein, the scalable context quantizer 200 derives the scalable context model 220 from the $2^N$ conditioning states 210, derived from N binary context events 230, using a context quantizer 240 and a model scaler 250. From the $2^N$ potential conditioning states 210, the context quantizer 240 generates a plurality of context models 260 for each of a plurality of respective bit rates. As will be further described below, in one mode, the context quantizer 240 determines whether worthwhile compression gain is sacrificed by quantizing higher order conditioning states to a parent conditioning state.

The model scaler 250 recognizes a basic context model 270 that is used for coding a source at a low bit rate and how the basic context model 270 is adapted for higher bit rates by the context quantizer 240. More specifically, in one mode, the model scaler 250 determines when conditioning states previously quantized to parent conditioning states have been replaced by one or more levels of child conditioning states to achieve a compression gain at a higher bit rate.

Instead of providing a plurality of complete context models for each of the respective bit rates, however, the scalable context quantizer 200 presents a single basic context model 270 and a set of enhancement bits 280. As further described in connection with FIG. 6, the enhancement bits 280 are generated by the model scaler 250 as an indication of how the basic context model is adapted to the generate a context model adapted for a higher bit rate. By analogy, context models for each of a number of bit rates can be reconstituted from the basic context model 270 by applying one or more sets of enhancement bits 280.

In one embodiment of the scalable context quantizer 220, the basic context model 270 is a context model quantized for coding the source at a lowest anticipated bit rate. As is described below with regard to FIG. 3, in one mode of the scalable context quantizer 220, the context models 260, including the basic context model 270, are be quantized to improve compression gain for each bit rate.

For each of the higher anticipated bit rates for which the source may be coded, there may be a set of enhancement bits to adapt a previously derived context model suites for coding at a lower bit rate. The context model for the next lower bit rate may include the basic context model 270 or a context model previously derived from the basic context model 270 using one or more sets of enhancement bits. The one or more sets of enhancements bits each are generated to adapt a context model for a next lower bit rate for coding at a current bit rate. By applying the enhancement bits to the conditioning states in a previously derived context model, as described in connection with FIG. 6, the previously derived context model for use in coding the current bit rate is derived.

In sum, a mode of the scalable context quantizer 200 quantizes available conditioning states in context models for each of a plurality of bit rates used to code the source to improve compression gain. However, instead of storing each of the context models for each of the bit rates, the context models are reduced to a basic context model and a series of enhancement bits from which each of the context models can be derived.

Process of Generating a Scalable Context Model and Enhancement Bits

Figure 3:
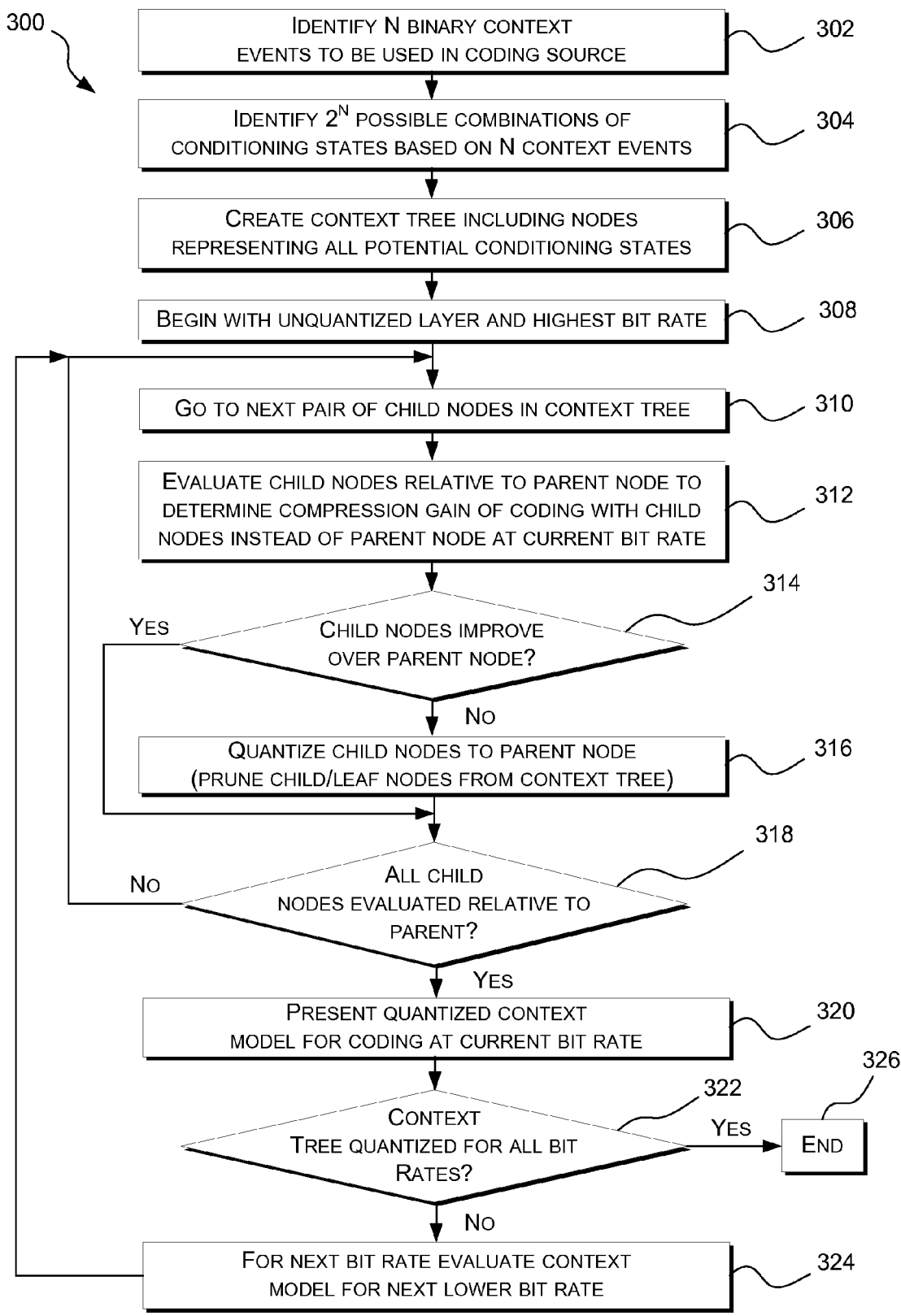
FIG. 3 is a flow diagram of a mode of quantizing context models to generate context models suitable for each of a plurality of bit rates.

FIG. 3 is a flow diagram of a process 300 used in generating a scalable context model as introduced with regard to FIG. 2. In one mode, at 302, N binary context events are identified to be used in coding samples from a source. At 304, the $2^N$ possible conditioning states based on the N context events are identified. As is described further below, it may be desirable to order the context events to present conditioning states to reduce entropy and enhance compression.

Figure 4:
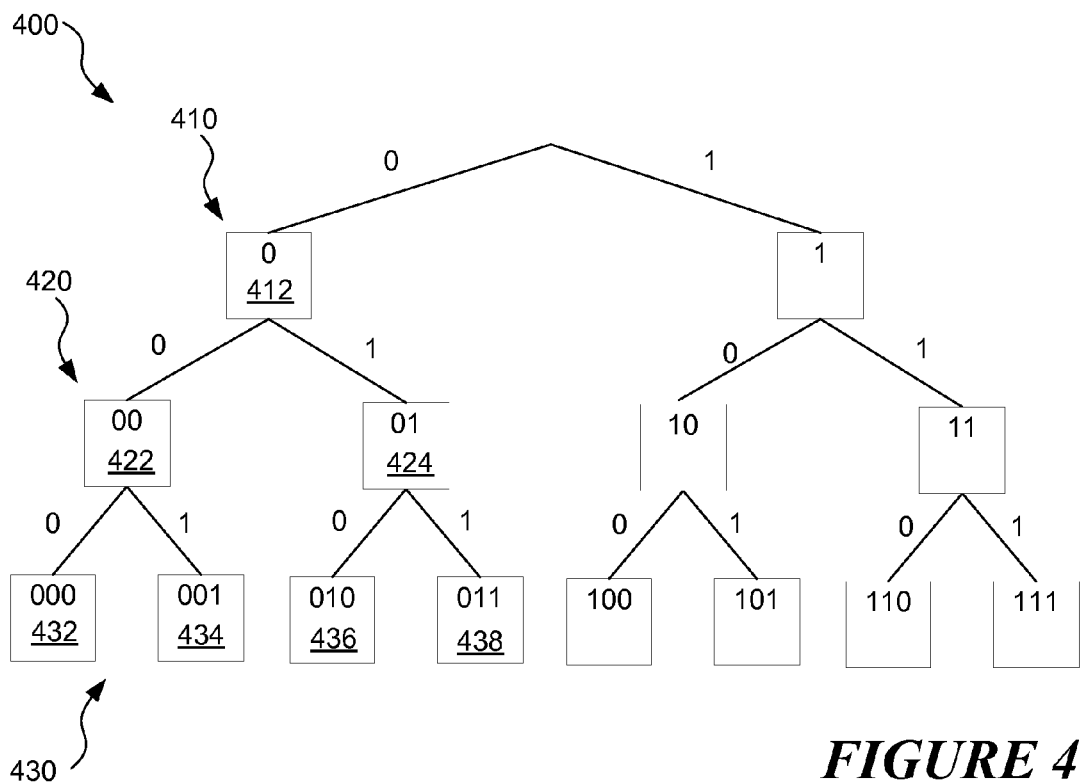
FIG. 4 is a diagram of a full context tree model prior to quantization performed according to FIG. 3.

At 306, a context tree model is created including nodes representing the potential conditioning states, as illustrated in FIG. 4. The context tree model 400 represents all of the possible conditioning states for three binary context events. The context tree 400 includes N layers where, as in the example of FIG. 4, N is equal to 3. The layers range from a topmost layer, layer 1 410 to a bottom layer, layer 3 430. The bottom layer 430 of the context tree 400 includes all of the possible three-bit conditioning states. Each next higher layer, including layers 420 and 410, includes one or more conditional states or nodes that may be quantized from conditional states or nodes in a lower layer. For example, layer 2 420 includes parent conditioning state 00 422, to which potentially will be quantized child conditioning states 000 432 and 001 434. Similarly, layer 2 420 includes parent conditioning state 01 424, to which potentially will be quantized child conditioning states 010 436 and 011 438. Layer 1 410 includes parent conditioning state 0 412 to which potentially will be quantized child conditioning states 00 422 and 01 424. Using such a context tree model in general is described in "Tree Coding of Bi-Level Images," B. Martins and S. Forschammer, IEEE Transactions on Image Processing, vol. 7, pp. 517-528 (April 1998).

Referring again to FIG. 3, at 308, quantizing context models begins with an unquantized layer and processing for the highest bit rate. At 310, the process 300 proceeds to a next pair of child conditioning states or nodes. At 312, the child conditioning states are evaluated relative to its parent node to determine whether there is any compression gain of coding with the child conditioning states instead of the parent conditioning state at the current bit rate.

In one mode, compression gain achieved by using any particular conditioning states is determined according to Eq. (1):

$$G(C, C_0, C_1) = I(C) - [I(C_0) + I(C_1)] - \text{Split Cost} \quad (1)$$

In Eq. (1), G is the compression gain, which is determined as a function of three conditioning states: C represents the parent conditioning state, and $C_0$ and $C_1$ represent each of the child conditioning states. The Split Cost represents a predefined value limiting a number of quantized conditioning states. I is the entropy of a subject conditioning state X calculated according to Eq. (2):

$$I(X) = f_1 \left( \log \frac{f_1^X + \delta}{f_1^X + f_0^X + \delta} \right) + f_0 \left( \log \frac{f_0^X + \delta}{f_1^X + f_0^X + \delta} \right) \quad (2)$$

In Eq. (2), $f_1^X$ is a number of encoded significant bits, $f_0^X$ is a number of encoded insignificant bits, and $\delta$ is a constant. In one mode, the constant $\delta$ is set equal to 0.45. The constant $\delta$ is optimized using JBIG, as described in "JBIG: Progressive Bi-Level Image Compression," ISO/IEC International Standard 11544 (1993).

At 314, it is determined if using child conditioning states provide a compression gain over their parent conditioning state. If not, at 316, the child conditioning states are quantized to the parent conditioning state, thereby pruning the child conditioning states or child nodes from the context tree. Two points should be noted. First, whether there is a compression gain realized by using the child conditioning states may be determined by whether using the child conditioning states provides any compression gain or a threshold compression gain such that the compression gain is worth increasing the size of the context model to include the child conditioning states. Second, the determination at 312 and comparison at 314 may be performed iteratively. It may be determined that, for a particular bit rate and source, that not only should the child conditioning states be quantized to their parent states, but that one the conditioning states on one or more additional layers also should be quantized.

Figure 5:
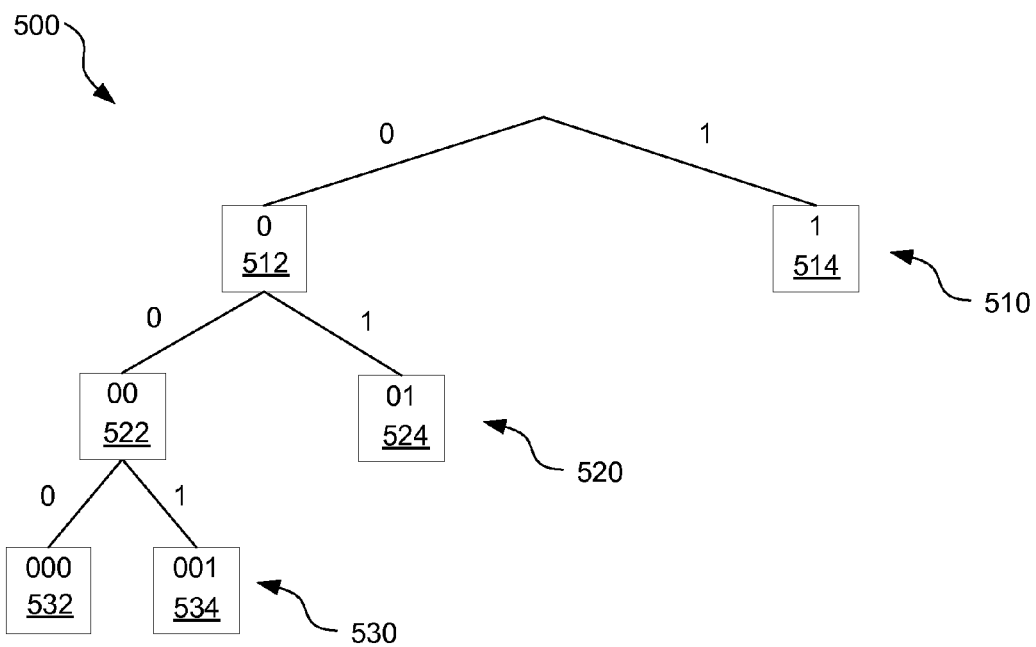
FIG. 5 is a diagram of a context tree model quantized according to a process of FIG. 3.

FIG. 5 illustrates a context tree 500 representing the context tree 400 (FIG. 4) for which a plurality of conditioning states have been quantized to parent conditioning states. For a bottom third layer 530, it is determined that child conditioning state 000 532 and child conditioning state 001 534 provide a desirable compression gain over using parent conditioning state 00 522 on the second layer 520. Thus, child conditioning states 000 532 and 001 534 are not quantized to their parent conditioning state 00 522.

On the other hand, based on the determined compression gain, by comparison with FIG. 4, child conditioning states 010 436 and 011 438 have been quantized to parent conditioning state 01 524. In addition, every conditioning state that was a child or grandchild of conditioning state 1 514 has been quantized to conditioning state 1 514. As previously described, the context tree 400 may have been quantized to the context tree 500 for a next highest anticipated bit rate, or the context tree 500 may be the result of the context tree 400 being successively quantized for each of a plurality of anticipated bit rates.

Referring back to FIG. 3, after it is determined that the potential compression gain dictates quantizing the conditioning states at 316, or if it was determined at 314 there was no such compression gain, at 318, it is determined if all the child conditioning states or nodes have been evaluated. If not, the process loops to 310 to identify the next two child conditioning states or nodes to determine whether they should be quantized. On the other hand, if it is determined at 318 that all the child conditioning states have been evaluated, at 320, the quantized context model is presented for use at the current bit rate.

At 322, it is determined if the context tree has been quantized for all anticipated bit rates. If not, at 324, the context model for the next highest bit rate, which was just presented at 320, is evaluated at the next lower bit rate, and the process loops to 310 to begin the process of quantizing the context model for the next lower bit rate. On the other hand, if it is determined at 322 that the context tree has been quantized for all bit rates, the process ends at 326.

Generating Enhancement Bits to Extend a Lower Order Context Model

Figure 6:
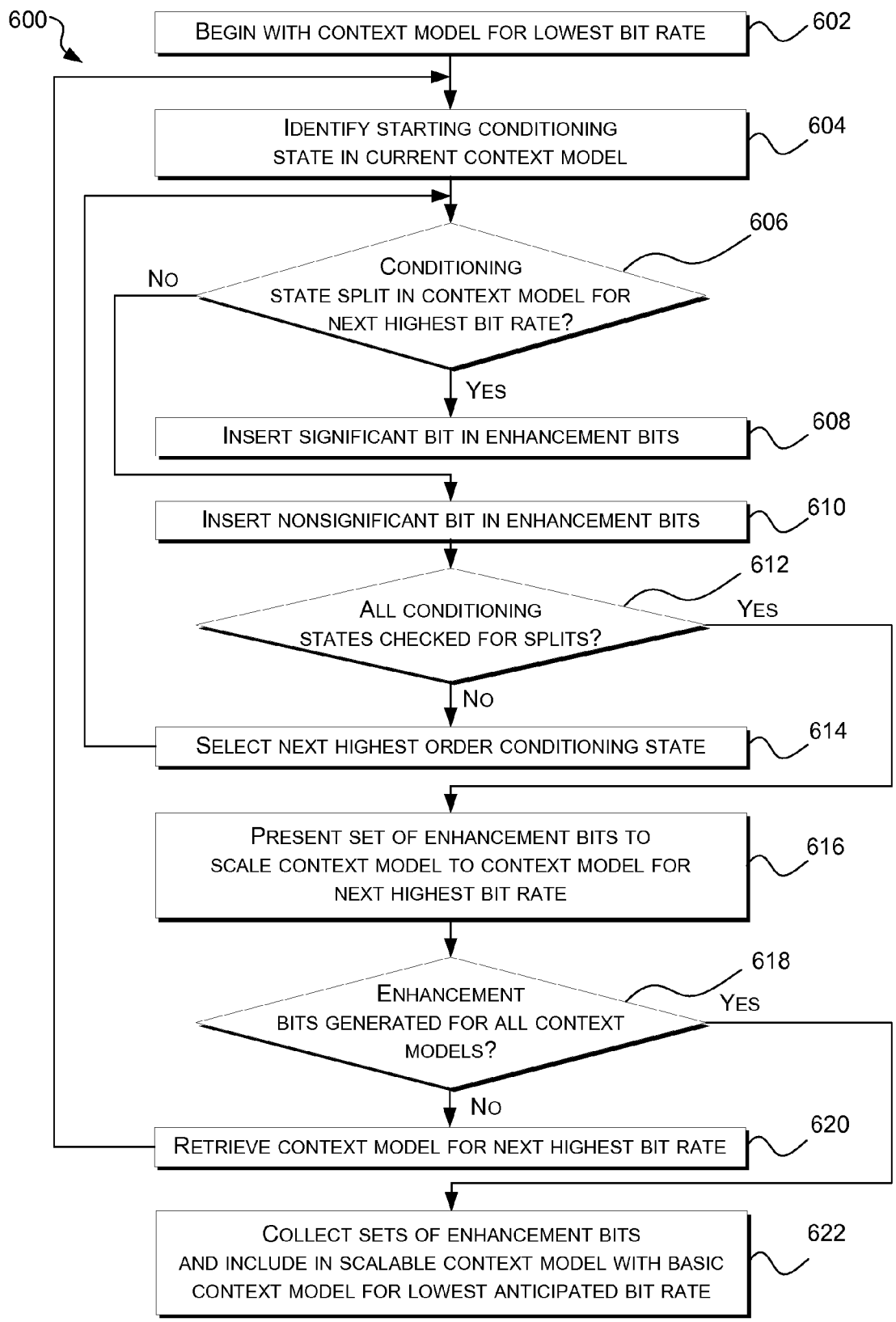
FIG. 6 is a flow diagram of a mode of generating enhancement bits for scaling a higher-order context model from a lower-order context model.
Figure 7:
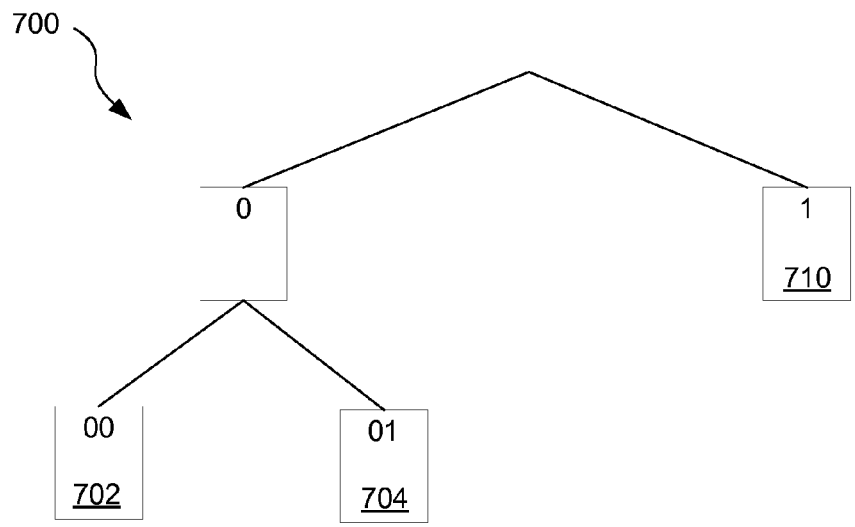
FIG. 7 is a diagram of a context tree model to be scaled to a higher-order context tree.
Figure 8:
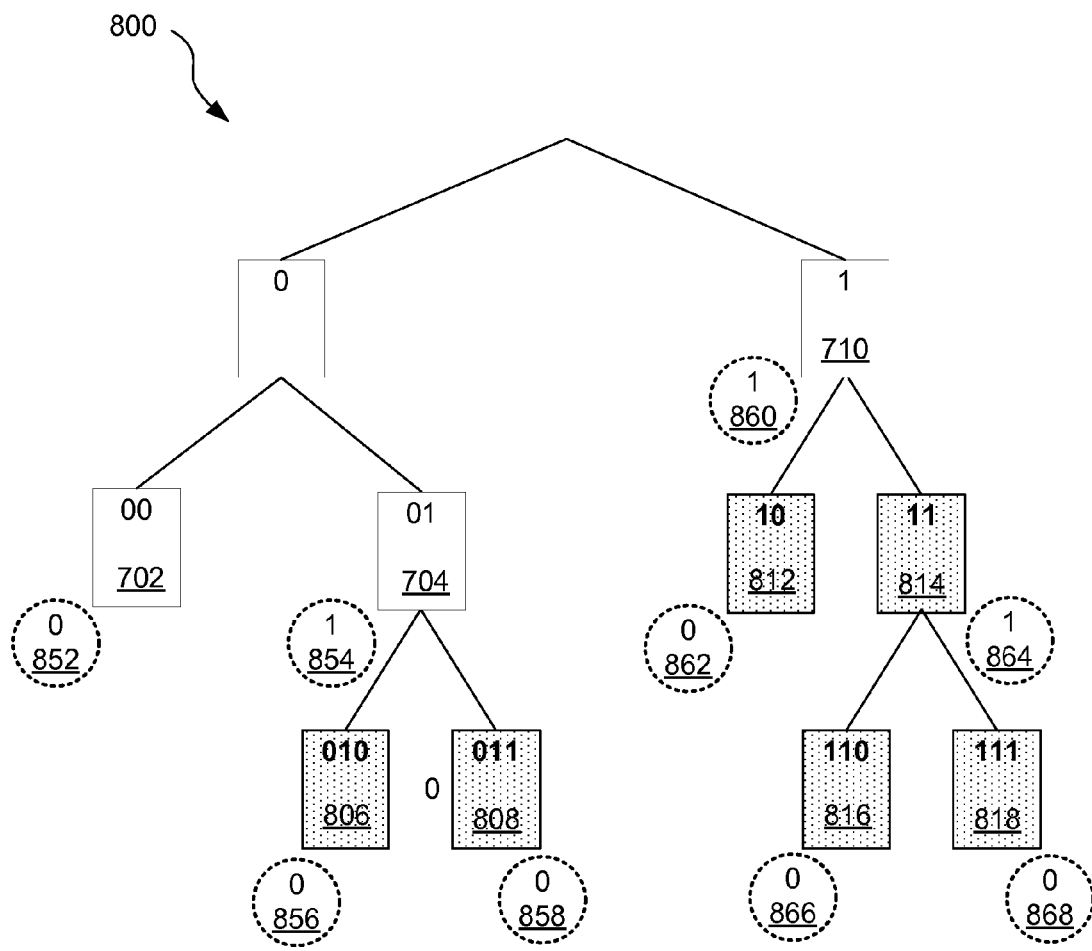
FIG. 8 is a diagram of a higher-order context tree model scaled from the context tree of FIG. 7 with enhancement bits indicating how the higher-order context tree is scaled from the lower order context tree.

As previously described with regard to FIG. 2, a mode of a scalable context quantizer generates a scalable context model 220 including a basic context model 270 and one or more sets of enhancement bits 280 that allow the basic context model 270 to be extended to one or more higher order context models suitable for higher bit rates. FIG. 6 is a flow diagram of a process 600 for comparing a context model generated for one bit rate to the context model for a next higher bit rate and generating the appropriate enhancement bits. FIGS. 7 and 8 provide examples of how the enhancement bits derived to represent how to adapt a lower order context model (FIG. 7) for a lower bit rate to a higher order context model for a next higher bit rate (FIG. 8).

In FIG. 6, the process 600 begins at 602 with the context model that was generated for the lowest anticipated bit rate. As previously described with regard to FIG. 3, in one mode, a context tree model is generated included all the potential conditioning states. Then, for each of the anticipated bit rates, from the highest to the lowest, a context model is generated by quantizing child conditioning states to their parent conditioning states when using the child conditioning states does not result in a desired compression gain. Thus, the context tree is systematically quantized for each succeeding lower anticipated bit rate. The process 600 of FIG. 6 follows a reverse order, starting with the context model for the lowest anticipated bit rate and generating enhancement bits to scale the context model for each succeeding higher anticipated bit rate.

At 604, a starting conditioning state in the current context model is identified. Starting with the context model for the lowest bit rate, the lowest bit rate context model thus is the current context model. In addition, in one mode, the process of generating enhancement bits begins with the highest order conditioning state at a low magnitude end of the context model. As is discussed further below, in the example of FIGS. 7 and 8, the starting conditioning state is conditioning state 00 702, the highest order conditioning state on the left, low magnitude side of the context model.

At 606, by comparing the current conditioning state in the current context model with the current conditioning state in the context model for the next lower bit rate, it is determined whether the current conditioning state is split into child conditioning states in the higher order model. In other words, it is determined whether, in the context model for the next higher bit rate, the child conditioning states were quantized to their parent conditioning state. If so, at 608, a significant bit is inserted in the enhancement bits to represent the split of the conditioning state. On the other hand, if it is determined at 606 that the conditioning state is not split, a nonsignificant bit is inserted in the enhancement bits. It should be noted that using a significant bit to represent a conditioning state that is split into child conditioning states and using a nonsignificant bit to represent a child conditioning state that is not split is a convention, and an opposite designation of bits or some other form of indication could be used. However, the convention may be considered appropriate, because a nonsignificant bit, or zero, indicates there is no enhancement from the current conditioning state into child conditioning states, while a significant bit, or one, indicates there is enhancement from the current conditioning states into its child conditioning states.

After either a significant bit or a nonsignificant bit is inserted in the enhancement bits at 608 or 610, respectively, at 612 it is determined if all the conditioning states have been checked to see if all the conditioning states in the current context have been checked to determine if each is split into child conditioning states in a context model for a next higher bit rate. As is described below with reference to FIG. 8, checking the conditioning states includes any child conditioning states into which conditioning states in the current context model have been split. If not, at 614, the next highest order conditioning state in the current context model is selected, and the process 600 loops to 606 to evaluate whether this conditioning state is split into child conditioning states. On the other hand, if it is determined at 612 that all the conditioning states have been checked, at 616, a set of enhancement bits is presented for use in scaling the context model for the current conditioning state to a context model for a next higher bit rate.

At 618, it is determined if enhancement bits have been generated to describe how to adapt a context model from each lower bit rate to each higher bit rate. In other words, at 618, it is determined if enhancement bits have been generated to describe how to create the highest order context model for the highest anticipated bit rate. If not, at 620, the context model for the next higher bit rate is retrieved or accessed, and the process 600 loops to 604 to identify the starting conditioning state in the new current context model to begin the enhancement bit evaluation.

On the other hand, if it is determined at 618 that all enhancement bits used in generating all the context models for all of the anticipated bit rates have been generated, at 622, each of the sets of enhancement bits is included in the scalable context model 220 (FIG. 2) with the basic context model for use in deriving each of the context models for each of the bit rates from a context model for a next lower bit rate. The scalable context model 220 is then stored with or transmitted with the compressed image data for use in reconstituting source data at a selected bit rates.

FIGS. 7 and 8 illustrate context models 700 and 800 suitable for coding an image at a lower bit rate and a higher bit rate, respectively, to illustrate how a set of enhancement bits is derived to scale context model 800 from context model 700. A previous context model 700, for sake of example, may represent a context model for a lowest anticipated bit rate, and a next context model 800 may represent a context model for a second lowest anticipated bit rate. Alternatively, context models 700 and 800 may represent context models for any pair of bit rates, and the enhancement bits will indicate how to scale from the lower order context model 700 for a lower bit rate to the higher order context model 800 for a higher bit rate. The enhancement bits may be used to indicate how to scale between any two context models, and are not limited to only indicating how to adapt between adjacent bit rates.

In FIG. 8, child conditioning states into which a parent conditioning state has been split are presented in boldface type and shaded for purposes of highlighting the additional conditioning states. Enhancement bits are represented by dashed circles containing either a "0," for a nonsignificant bit or a "1" for a significant bit.

According to a mode of the enhancement bit generation process of FIG. 6, in FIG. 7, a starting conditioning state is identified as the highest order conditioning state on the lowest magnitude side of the context model tree 700. Thus, the starting conditioning state is conditioning state 702 00. Starting with conditioning state 00 702, it is determined if each of the conditioning states in the previous context model 700 is split into child conditioning states in the next context model 800 for a higher bit rate. Comparing conditioning state 00 702 in the context models 700 and 800, conditioning state 00 702 is not split into child conditioning states in next context model

800. Because conditioning state 00 702 is not split, according to the convention of the process 600 (FIG. 6), a nonsignificant bit or "0" 852 is inserted as an enhancement bit.

Because conditioning state 00 702 is not scaled into child conditioning states, moving in order of magnitude from left to right across the context tree model as previously described, the next highest order conditioning state is conditioning state 01 704. Comparing context models 700 and 800, conditioning state 01 704 is split into child conditioning states 010 806 and 011 808. Thus, a significant bit or one 854 is inserted as an enhancement bit for conditioning state 01 704. Moving to the next highest order conditioning states from conditioning state 01 704 involves moving to the child conditioning states 010 806 and 011 808. Neither of these child conditioning states is further split into child conditioning states. Thus, nonsignificant bits 856 and 858 are inserted as enhancement bits for conditioning states 010 806 and 011 808, respectively.

Because there are no further child conditioning states of a higher order for conditioning states 010 806 and 011 808, the next highest order conditioning state in terms of magnitude is 1 710. Conditioning state 1 710 is split into child conditioning states 10 812 and 11 814, thus, a significant bit 860 is inserted in the enhancement bits for conditioning state 1 710. The next higher order conditioning state is child conditioning state 10 812, the lower magnitude of the two child conditioning states 10 812 and 11 814 into which parent conditioning state 1 710 has been split. Conditioning state 10 812 is not further split into child conditioning states, thus a nonsignificant enhancement bit 862 is inserted for conditioning state 10 812. By contrast, conditioning state 11 814 is further split into child conditioning states 110 816 and 111 818. Thus, a significant enhancement bit 864 is inserted for conditioning state 11 814. The child conditioning states 110 816 and 111 818 are not further split into child conditioning states, so nonsignificant enhancement bits 866 and 868, are inserted for conditioning states 110 816 and 111 818, respectively.

Thus, according to a mode of context model scaling, a set of enhancement bits to scale previous context model 700 to next context model 800 begins with the starting conditioning state and continues through the higher order and higher magnitude conditioning states. This is the same order in which the enhancement bits were previously identified with reference to FIGS. 7 and 8. In order, the enhancement bits are presented in order in Table (1). The reference numerals from FIG. 8 are included (in parentheses) for clarity:

TABLE 1

| Conditioning State | Enhancement Bit |
|---|---|
| 00 (702) | 0 (852) |
| 01 (704) | 1 (854) |
| 010 (806) | 0 (856) |
| 011 (808) | 0 (858) |
| 1 (710) | 1 (860) |
| 10 (812) | 0 (862) |
| 11 (814) | 1 (864) |
| 110 (816) | 0 (866) |
| 111 (818) | 0 (868) |

Thus, collecting the enhancement bits from Table (1) in order, a set of enhancement bits to scale the previous context model to the next context model, the set of enhancement bits is 010010100. The next context model thus is representable by this series of nine bits, instead of by an entire additional context model.

If the next context model 800 included different conditioning states, the resulting sets of enhancement bits would be different. For sake of example, if conditioning state 11 814 were not further split into child conditioning states 110 816 and 111 818, the significant enhancement bit 864 would be replaced by a nonsignificant enhancement bit and there would be no higher order child conditioning states for which enhancement bits would be generated. Thus, replacing the significant enhancement bit 864 with a nonsignificant enhancement bit, and truncating the last two enhancement bits, the set of enhancement bits would be 0100100. For another example, if the starting conditioning states 00 702 were split into child conditioning states, the nonsignificant enhancement bit 0 852 would be replaced by a significant enhancement bit, and nonsignificant enhancement bits would be inserted after that significant enhancement bit for each of its child conditioning states. Thus, the set of enhancement bits would be 10010010100.

It should be noted that, the more conditioning states that are added between a previous conditioning state and a next conditioning state, the more enhancement bits there will be. Nonetheless, the additional enhancement bits consume less storage than including the additional conditioning states themselves. In addition, as previously described, the mode of generating enhancement bits described with reference to FIGS. 6, 7 and 8 is just one mode of generating enhancement bits, and different protocols, such as by using symbols for representing splits, proceeding in a different order, and other variations may be used.

Scaling a Previous Context Model Using Enhancement Bits

Figure 9:
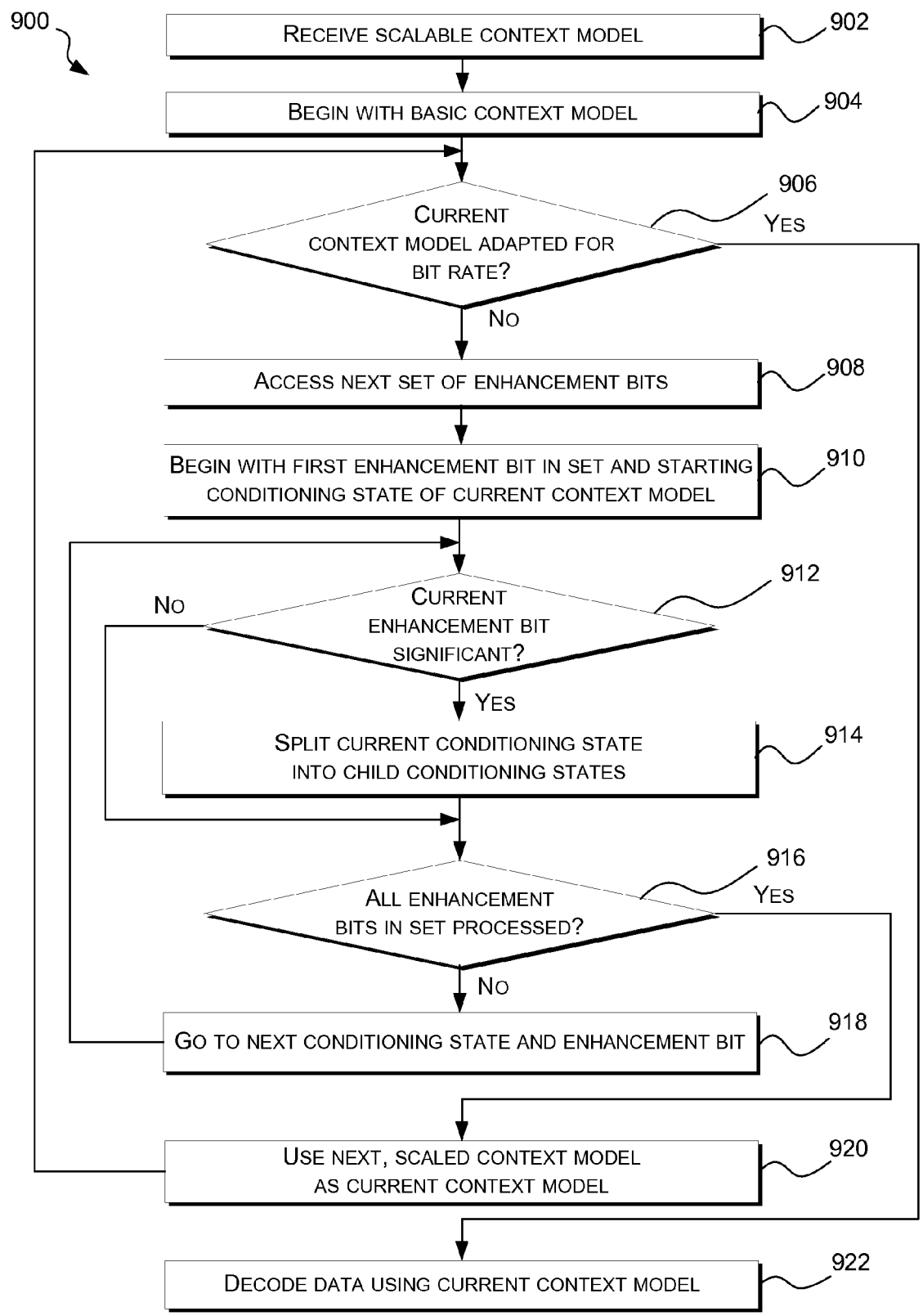
FIG. 9 is a flow diagram of a mode of scaling a higher order context model from a lower order context model using enhancement bits.
Figure 10:
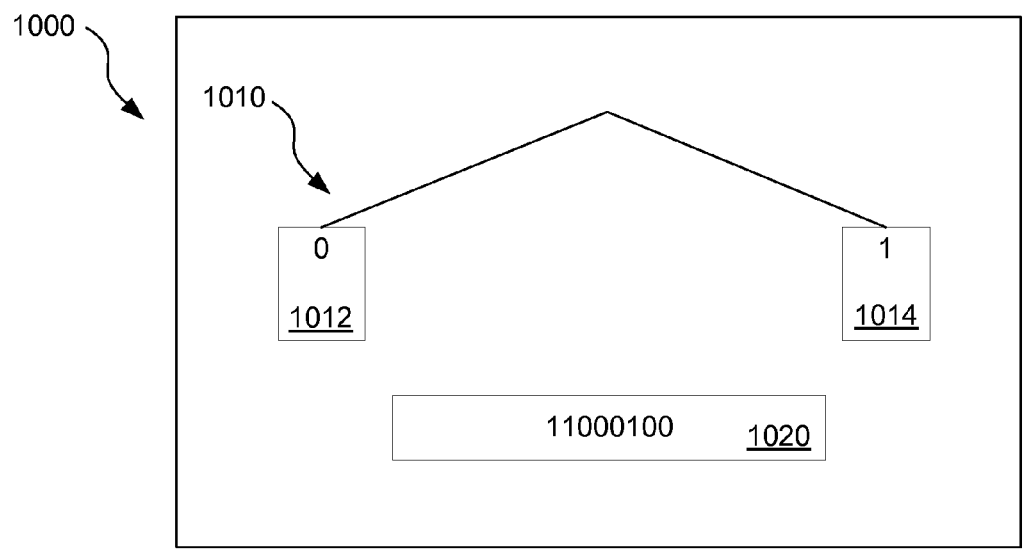
FIG. 10 is a diagram of a scalable context quantizer including a basic context model and a set of enhancement bits.
Figure 11:
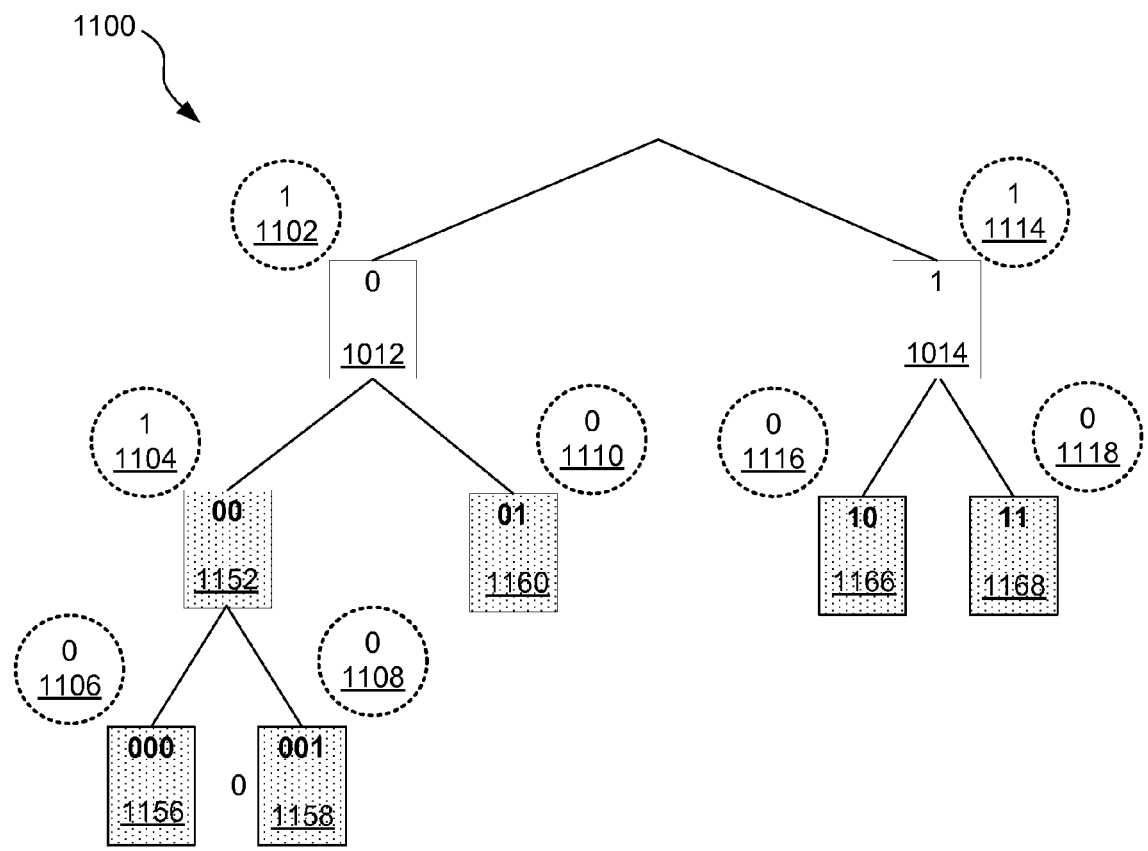
FIG. 11 is a higher order context tree derived from the basic context model and the enhancement bits of FIG. 10.

FIG. 9 illustrates a process 900 for scaling a context model using enhancement bits provided in a scalable context model. The process 900 is an iterative process usable to scale each of a plurality of context models to a next higher order model, such as for a next higher bit rate. FIGS. 10 and 11 provide an example of an iteration of scaling a lower order context model 1000 to a higher order context model 1100 using a set of enhancement bits. For sake of further illustration, the examples of the lower order context model 1000 and higher order context model 1100 are different than those used in the example illustrated in FIGS. 7 and 8.

Referring to FIG. 9, at 902, a scalable context model, including a basic context model and one or more sets of enhancements bits, is received for possible use in decoding a data file. At 904, the process 900 begins with the basic context model which, as previously described, is the context model generated for coding and decoding a source at the lowest anticipated bit rate.

At 906, it is determined if the current context model is adapted for decoding the data at the appropriate bit rate. If so, the process 900 advances to 922 to decode the data using the current context model. On the other hand, if the current context model is not scaled for the appropriate bit rate, at 908, the next set of enhancement bits is accessed. At 910, scaling according to the enhancement bits begins with the first enhancement bit in the set of enhancement bits and the starting conditioning state, as previously described in connection with FIG. 6.

At 912, it is determined if the current enhancement bit is significant or nonsignificant as previously described. If the bit is significant, at 914, the current conditioning state is split into its child conditioning states. In one mode, the child conditioning states are arrayed from lower magnitude to higher magnitude values.

Once the conditioning state is split at 914, or if it was determined at 912 that the enhancement bit was nonsignificant, at 916, it is determined if all the enhancement bits in the current set have been processed, which indicates that all the conditioning states in the current context model have been scaled for the next bit rate. If not, at 918, the next conditioning state and enhancement bit are selected and the process loops to 912 to evaluate the current enhancement bit. As previously described, in one mode, a next conditioning state is a next higher order conditioning state or a next higher magnitude conditioning state. However, also as previously described, as long as the encoder and decoder observe the same protocol, a different processing order may be selected.

On the other hand, if it is determined at 916 that all the enhancement bits in the set have been processed, the context model has been fully scaled to a next context model for a next higher bit rate. Thus, at 920, the next, scaled content model becomes the current context model. At 906, it is determined if the current context model is adapted for the appropriate bit rate. If so, the process advances to 922 to decode the data using the current context model. On the other hand, if the current context model still is not scaled to the appropriate bit rate, at 908, the next set of enhancement bits is accessed to further scale the context model. The process 900 thus repeats until the appropriate context model is generated.

To illustrate the scaling process, FIG. 10 presents an exemplary scalable context model 1000. The scalable context model 1000, as previously described with reference to FIG. 2, includes a basic context model 1010 for a lowest anticipated bit rate and one or more sets of enhancement bits 1020 to scale the basic context model to a context model for an appropriate bit rate. The exemplary basic context model 1010 includes two conditioning states, conditioning state 0 1012 and 1 1014. The enhancement bits 1020 includes a single set of enhancement bits, 11000100. For clarity, the enhancement bits are delineated into a sequence in Table (2) with reference numbers used in FIG. 11 to clarify the application of each of the bits:

TABLE 2

| Sequence Number | Enhancement Bit |
| --- | --- |
| 1 | 1 (1102) |
| 2 | 1 (1104) |
| 3 | 0 (1106) |
| 4 | 0 (1108) |
| 5 | 0 (1110) |
| 6 | 1 (1114) |
| 7 | 0 (1116) |
| 8 | 0 (1118) |

In scaling the basic context model 1010 to the next context model 1100, the starting conditioning state again is the highest order, lowest magnitude conditioning state which, in this example, is conditioning state 0 1012. The first enhancement bit is a significant bit 1 1102, indicating that conditioning state 0 1012 is split into child conditioning states 00 1152 and 01 1160. The enhancement bit set has not been exhausted, thus a next conditioning state and a next enhancement bit are evaluated. The next conditioning state is conditioning state 00 1152, the lower magnitude conditioning state of the two higher order child conditioning states of conditioning state 0 1012, according to the protocol used in generating the enhancement bits. The second enhancement bit, enhancement bit 1 1104, is a significant bit. Thus, conditioning state 00 1152 also is split into its two child conditioning states, conditioning states 000 1156 and 001 1158.

The set of enhancement bits is not exhausted. Thus, the next conditioning state, child conditioning state 000 1156, is the next lowest magnitude, highest order conditioning state. The third enhancement bit, enhancement bit 0 1106 is non-significant. Thus, conditioning state 000 1156 is not further split. The next conditioning state is conditioning state 001 1158, the higher magnitude child conditioning state of conditioning state 00 1152. The fourth enhancement bit 0 1108 also is nonsignificant, thus, conditioning state 001 1158 is not further split.

Additional enhancement bits remain to be processed. Thus, the next conditioning state is identified as conditioning state 01 1160, next conditioning state of lowest magnitude and highest order, and which was added by the split of conditioning state 0 1012 based on the first enhancement bit 1 1102. The fifth enhancement bit is enhancement bit 0 1110. Because the bit is not significant, conditioning state 01 1160 is not split.

The next conditioning state, moving from left to right with reference to FIG. 11, is conditioning state 1 1014. The sixth enhancement bit is enhancement bit 1 1114, a significant bit indicating that conditioning state 1 1014 is split into child conditioning states 10 1166 and 11 1168. The next conditioning state is the lower magnitude child conditioning state 10 1166. The seventh enhancement bit is enhancement bit 0 1116, a nonsignificant bit indicating no further split of the conditioning states. The next and final conditioning state is conditioning state 11 1168, and the next and final enhancement bit is enhancement 0 1118. Because the bit is nonsignificant, conditioning state 11 1168 is not split. The set of enhancement bits 1020 has now been exhausted, thus the context model 1100 is fully scaled to the next higher bit rate, and may be used to decode data encoded at that bit rate.

As described with reference to FIG. 9, if the scaled context model 1100 is not the appropriate context model for the bit rate, another set of enhancement bits would be accessed to further scale the context model. This process would repeat until the context model for the appropriate bit rate is scaled.

Scalable Context Quantization for Embedded Wavelet Coding

Figure 12:
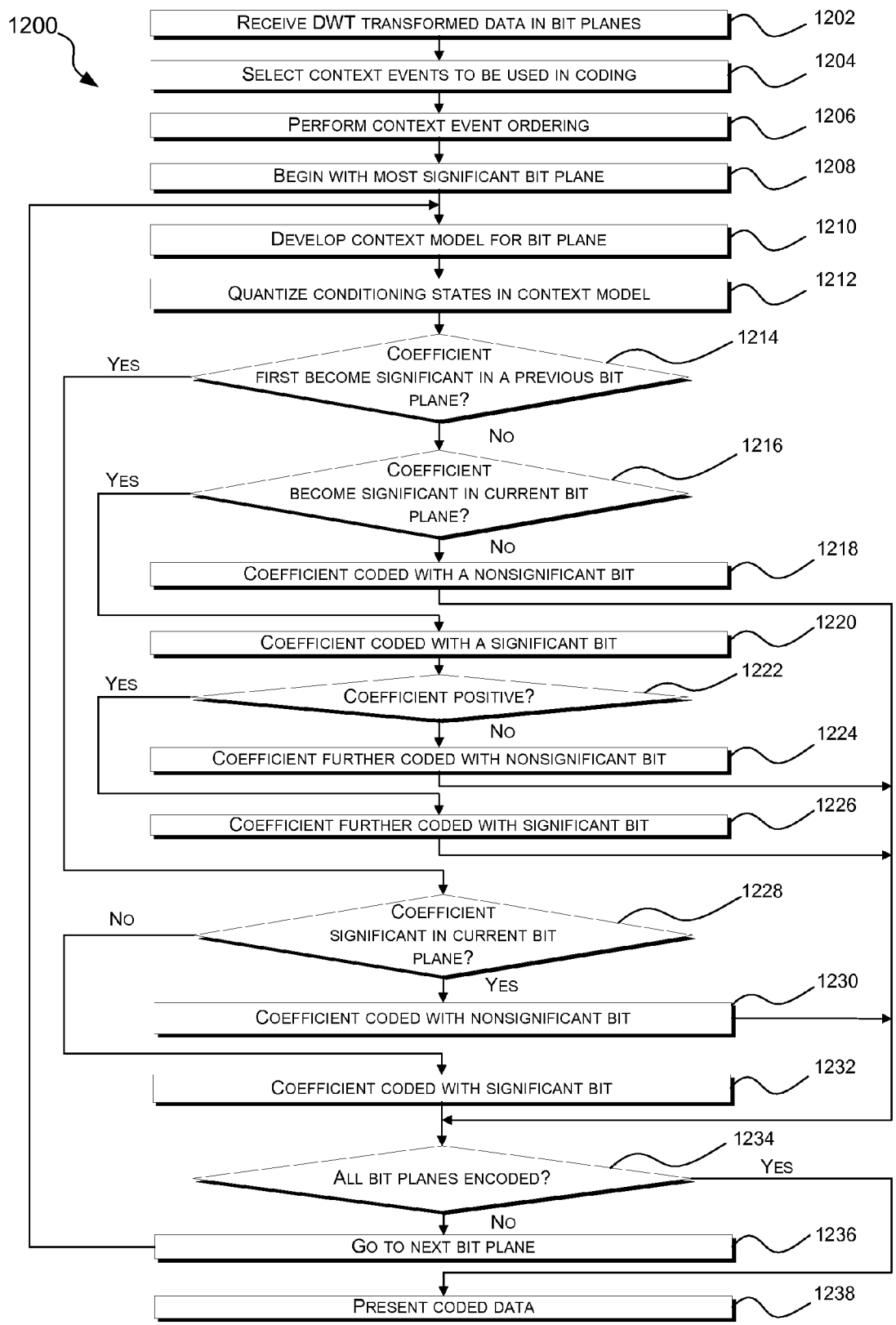
FIG. 12 is a flow diagram of a mode of scalable context quantization for image data transformed using embedded wavelet coding.

FIG. 12 is a flow diagram of a process 1200 for performing scalable quantization for embedded wavelet coding. Embedded wavelet coding, to name one application, is used in scalable codestreams such as Joint Photographic Experts Group 2000 ("JPEG2000") that allow for selectable access to content of the codestream at a range of access levels. In codestreams such as JPEG2000, bit plane coding is used. In bit plane coding, coefficients including a series of bits representing a multi-bit value are partitioned into bit planes according to the relative magnitude of each of the bits. A mode of scalable context quantization is well suited for use with codestreams employing embedded wavelet coding.

As is further explained below, in one mode, a set of context events includes bits in the same bit plane and for values for the same resolution, as well as bits in a next higher bit plane and for a value corresponding to a lower resolution of the data values. Selection of such a set of context events for discrete wavelet transformed image data facilitates coding efficiency because of the manner in which discrete wavelet transformed data is aligned.

At 1202, data transformed using discrete wavelet transformation (DWT) and separated into a series of bit planes is received. At 1204, a set of context events to be used in coding the data is selected. In a mode of coding, the set of context events includes context events representing values related to different image resolutions and different bit planes, as is further described below. At 1206, according to one mode as also further described below, the selected context events are ordered to enhance coding efficiency.

At 1208, coding begins with a most significant bit plane. At 1210, a generalized context model is developed for the bit plane. As previously described, a generalized model may include all the potential conditioning states available for the set of context events selected using a context model tree as previously described. At 1212, the conditioning states in the context model are quantized. As also previously described, the conditioning states may be quantized to reduce a higher order model to a lower order model when higher order conditioning states do not provide a desired compression gain over their parent conditioning states.

At 1214, it is determined if the coefficient has first become significant in a previous bit plane. If so, the process 1200 advances to 1228 for a magnitude refinement pass, which is described further below. On the other hand, if it is determined at 1214 that the coefficient has not first become significant in a previous bit plane, at 1216, it is determined if the coefficient has become significant in the current bit plane in what is termed a zero coding pass. If not, at 1218, the coefficient is coded with a nonsignificant bit, and the process 1200 advances to 1234 to determine if all the bit planes have been encoded. This is termed a zero coding pass because a nonsignificant bit or 0 is encoded for each bit plane until a coefficient becomes significant in the current bit plane.

On the other hand, if it is determined at 1216 that the coefficient has become significant in the current bit plane, at 1220, the coefficient is coded with a significant bit. Then, at 1222, it is determined if the coefficient is positive in what is termed a sign coding pass. The sign coding pass is used to code the sign of the coefficient in association with a significant bit coded when a coefficient first becomes significant in the current bit plane. If the coefficient is not positive, at 1224, the coefficient is further coded with a nonsignificant bit. On the other hand, if it is determined at 1222 that the coefficient is positive, at 1226, the coefficient is further coded with a significant bit. Whether the coefficient is further coded with a nonsignificant bit at 1224 or a significant bit at 1226, the process 1200 advances to 1234 to determine if all the bit planes have been encoded.

At 1228, when it has been determined that the coefficient has become significant in a previous bit plane, it is determined if the coefficient is significant in the current bit plane in what is termed a magnitude refinement pass. As the name implies, the magnitude refinement pass further specifies the magnitude of the coefficient in the remaining, successively lower magnitude bit planes. If it is determined at 1228 that the coefficient is not significant in the current bit plane, at 1230, the coefficient is coded with a nonsignificant bit using the quantized context model. On the other hand, if it determined at 1228 that the coefficient is significant in the current bit plane, at 1232, the coefficient is coded with a significant bit using the quantized context model.

Once the coefficient has been coded with one or two bits based on whether the coefficient has become significant in a previous bit plane or in the current bit plane and whether the coefficient is positive or negative, at 1234, it is determined if all bit planes have been encoded. If not, at 1236, the process 1200 advances to the next lower magnitude bit plane and the process 1200 loops to 1210 to develop a context model for the next bit plane, and to repeat the coding process using the zero coding, sign coding, and magnitude refinement passes previously described. On the other hand, if it is determined at 1234 that all the bit planes have been encoded, the coding is complete and, at 1238, the coded data is presented for storage or transmission.

Using the process 1200, a single bit is coded for the coefficient in each bit plane except where the coefficient has first become significant in the current bit plane. When the coefficient first becomes significant in the current bit plane, the sign of the coefficient is also represented as positive or negative with an additional significant or nonsignificant bit, respectively. For all succeeding planes, the value of the coefficient is represented with a single bit using the respective quantized context model.

For example, a positive, eight-bit coefficient, 01100100, is considered. Beginning with the first, highest magnitude bit plane, at 1214, it is determined that the coefficient has not become significant in a previous bit plane. Thus, at 1216, it is determined that the coefficient is not significant in the current bit plane, and at 1218, the coefficient is coded with a nonsignificant bit, "0."

Advancing to the second bit plane, again at 1214, it is determined that the coefficient has not become significant in a previous bit plane. However, at 1216, it is determined that the coefficient has become significant in the current bit plane. Thus, at 1220, the coefficient is coded with a significant bit and, once it is determined at 1222 that the coefficient is positive, at 1226, the coefficient is further coded with a significant bit. Thus, the coefficient in the second bit plane is coded with a pair of bits, "11."

Further advancing to the third bit plane, at 1214, it is determined that the coefficient has become significant in a more significant bit plane. Thus, the process advances to 1228 to determine, in a magnitude refinement pass, that the coefficient is significant in the current bit plane. Thus, at 1232, the coefficient is coded with a significant bit using the quantized context model, "1." Once a coefficient has become significant in a previous bit plane, the process 1200 yields similar results for the remaining bit planes. Thus, for the remaining five bit planes, the coefficient is coded with a "0," a "0," a "1," a "0," and another "0."

Context Event Selection and Ordering to Improve Compression

Figure 13:
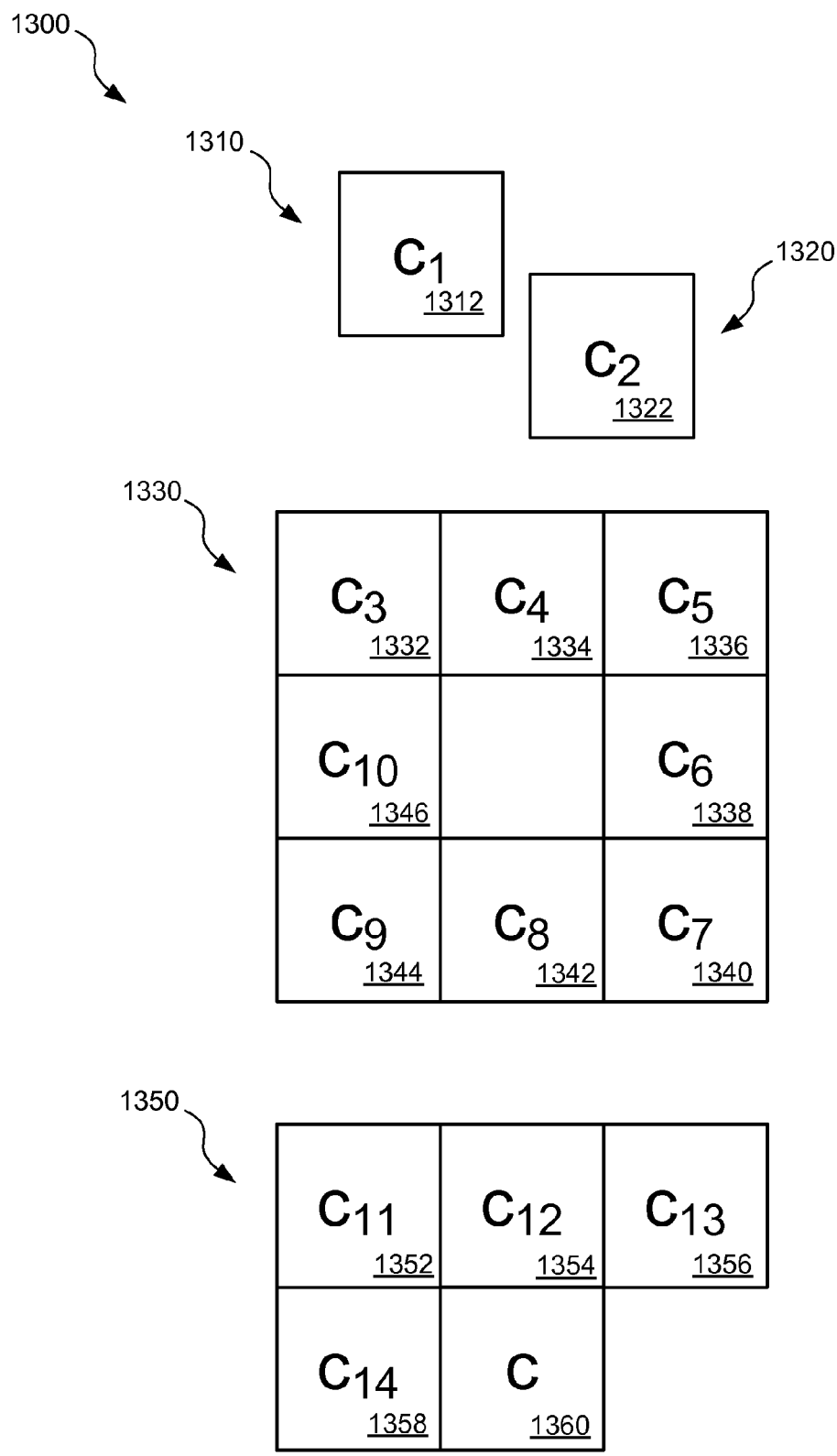
FIG. 13 is a block diagram of fourteen context events at a plurality of resolutions and in a plurality of bit planes for coding a value.
Figure 14:
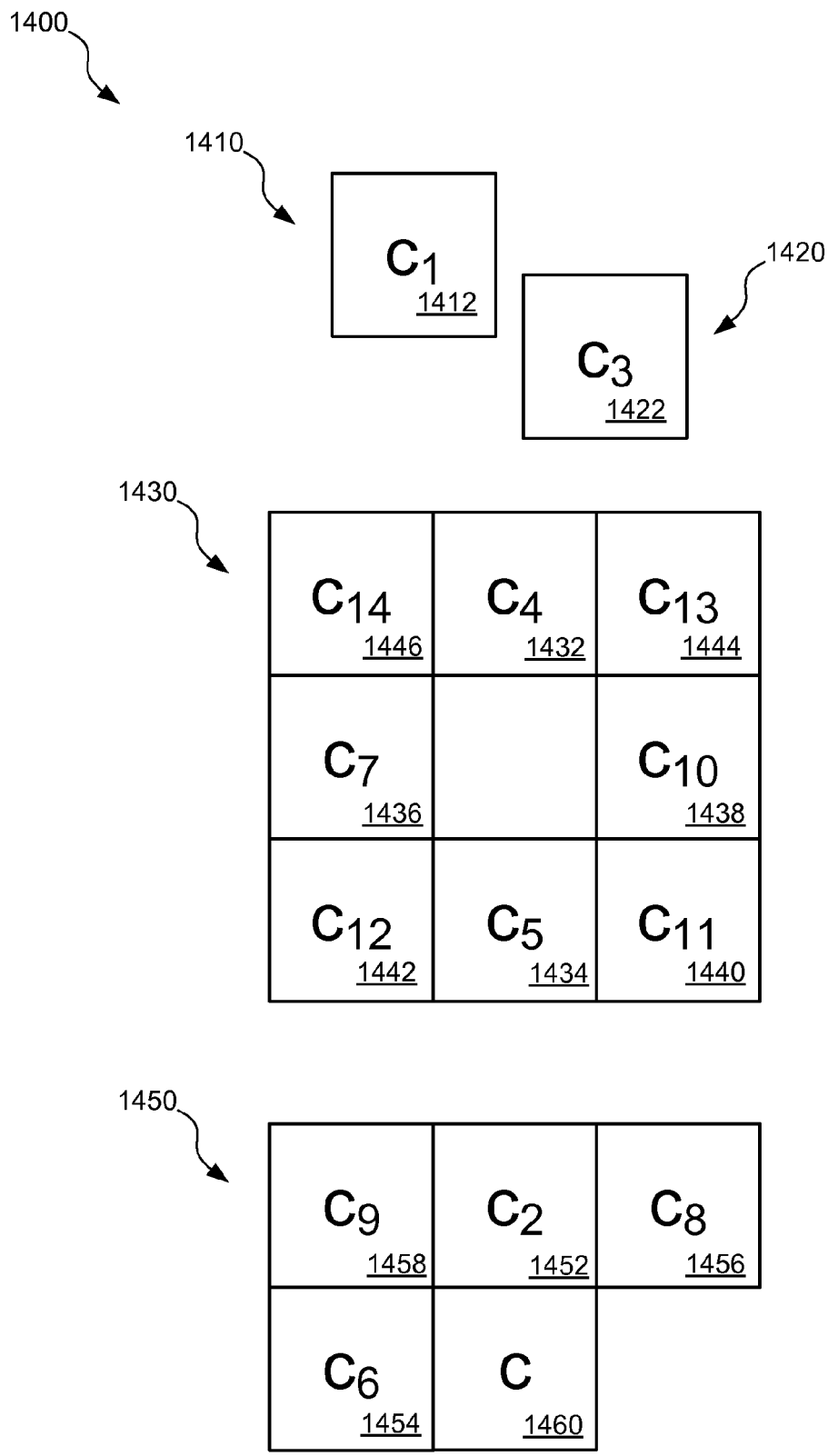
FIG. 14 is a block diagram of the fourteen context events of FIG. 13 ordered to achieve improved coding effectiveness.

As referenced in the process 1200 (FIG. 12), the context events may be selected and ordered in order to improve coding efficiency. FIGS. 13 and 14 illustrate a set of context events selected for use with embedded wavelet coding sequenced in order to optimize coding efficiency.

FIG. 13 illustrates a set of context events 1300 selected to optimize coding efficiency for bit plane coding of image data transformed by an embedded wavelet coder may be changed to improve coding efficiency. FIG. 13 shows a set of 14 context events. The context events are drawn from different resolution levels and different bit planes. As is understood in the art, embedded wavelet coding applies coefficients to a varying series of wavelets that vary around a zero value to represent a time domain signal in a frequency domain. As a consequence, selecting context events from different bit planes and from different resolution levels results in conditioning states that provide good convergence and, thus, effective compression.

More specifically, the set of context events 1300 includes two context events from the next lower resolution level, eight context events from the same resolution level and the next more significant bit plane, and four context events from the same resolution level and the same bit plane. Context event $c_1$ 1312, is the value of the corresponding pixel from a next lower resolution level in the next more significant bit plane 1310. Context event $c_{2,1}$ 322 is the value of the corresponding pixel from the next lower resolution level and the current bit plane 1320. Context events $c_3$ 1332, $c_4$ 1334, $c_5$ 1336, $c_6$ 1338, $c_7$ 1340, $c_8$ 1342, $c_9$ 1344, and $c_{10}$ 1346 are the values of the eight surrounding pixels at the same resolution level in the next more significant bit plane 1330. Context events $c_{11}$ 1352, $c_{12}$ 1354, $c_{13}$ 1356, and $c_{14}$ 1358 are the values from four neighboring pixels to the current value c 1360 at the same resolution level in the same bit plane 1350. The set of fourteen context events 1300 over these resolution levels in these bit planes presents a set of effective conditioning states.

Conventionally, context events may be sequenced according to distance between the context pixel and the pixel being encoded. For example, distance-based sequencing is suitable for bi-level image coding, where the context events are of the same resolution and in the same bit plane as the value being encoded. However, in other forms of coding, such as continuous-tone image coding, context events may be selected from other resolution levels and other bit planes. When context events are selected from different resolution levels and bit planes, distance to the value being coded is not a meaningful measure to use in sequencing the context events.

According to one mode, the context events are sequenced to minimize the resulting entropy. To minimize entropy, a greedy algorithm may be used. The following is one suitable, exemplary algorithm, where i is an order index, H(A\B) is the conditional entropy, C is the selected context, and $I_{\bar{C}}$ is a remaining set of events once one or more of the context events have been removed from the full set of events. Initially, i is equal to 1, C=φ, and $I_{\bar{C}}$ contains all N context events in the algorithm:

```
While I_C̄ ≠ φ
{
    find c_x from I_C̄ that minimizes H(Y|C∪c_x);
    set order i to c_x;
    C= C∪c_x;
    remove c_x from I_C̄;
    i++;
}
```

The greedy algorithm determines how to order the selected context event to reduce conditional entropy.

Reducing the conditional entropy by using a process such as the foregoing greedy algorithm, the fourteen context events in the set of context events 1300 (FIG. 13) is resequenced to present the set of context events 1400 shown in FIG. 14. As a result of the resequencing, context event $c_1$ 1412 again is the value of the corresponding pixel from a next lower resolution level in the next more significant bit plane 1410. However, context event $c_2$ 1452 is a value of a neighboring pixel, at the same resolution level and in the same bit plane as the current value c 1460, in the preceding row and same column. Context event $c_3$ is the value of the corresponding pixel in next lower resolution level and the current bit plane 1420. Context event $c_4$ 1432 is the value of a pixel from the preceding row and the same column at the same resolution level in the next more significant bit plane 1430, while context event $c_5$ 1434 is the value of a pixel in the following row and the same column at the same resolution level in the next more significant bit plane 1430.

Context event $c_6$ 1454 is a neighboring pixel in the same row and a preceding column at the same resolution level and in the same bit plane. Context event $c_7$, however, is the neighboring pixel in the same row and a preceding column of the same resolution level in a next more significant bit plane. Moving back to the same resolution level and the same bit plane, context event $c_8$ 1456 is a value of a neighboring pixel in a preceding row and a next column, and context event $c_9$ 1456 is the value of a neighboring pixel in a preceding row and a preceding column.

Changing bit planes again, however, context event $c_{10}$ is the value of a neighboring pixel in the same row and a following column for the same resolution level in a next more significant bit plane 1430. Staying at the same resolution level and in the next more significant bit plane, context event $c_{11}$ 1440 is the value of a neighboring pixel in a next row and a next column, and context event $c_{12}$ is a value of a neighboring pixel in a next row and a preceding column. Context event $c_{13}$ 1444 is a value of a neighboring pixel in a preceding row and a next column, and, finally, context event $c_{14}$ 1446 is a value of a neighboring pixel in a preceding row and a preceding column. Ordering the conditioning states from $c_1$ through $c_{14}$ yields conditioning states that minimize the conditional entropy to improve coding efficiency.

Computing System for Implementing Exemplary Embodiments

Figure 15:
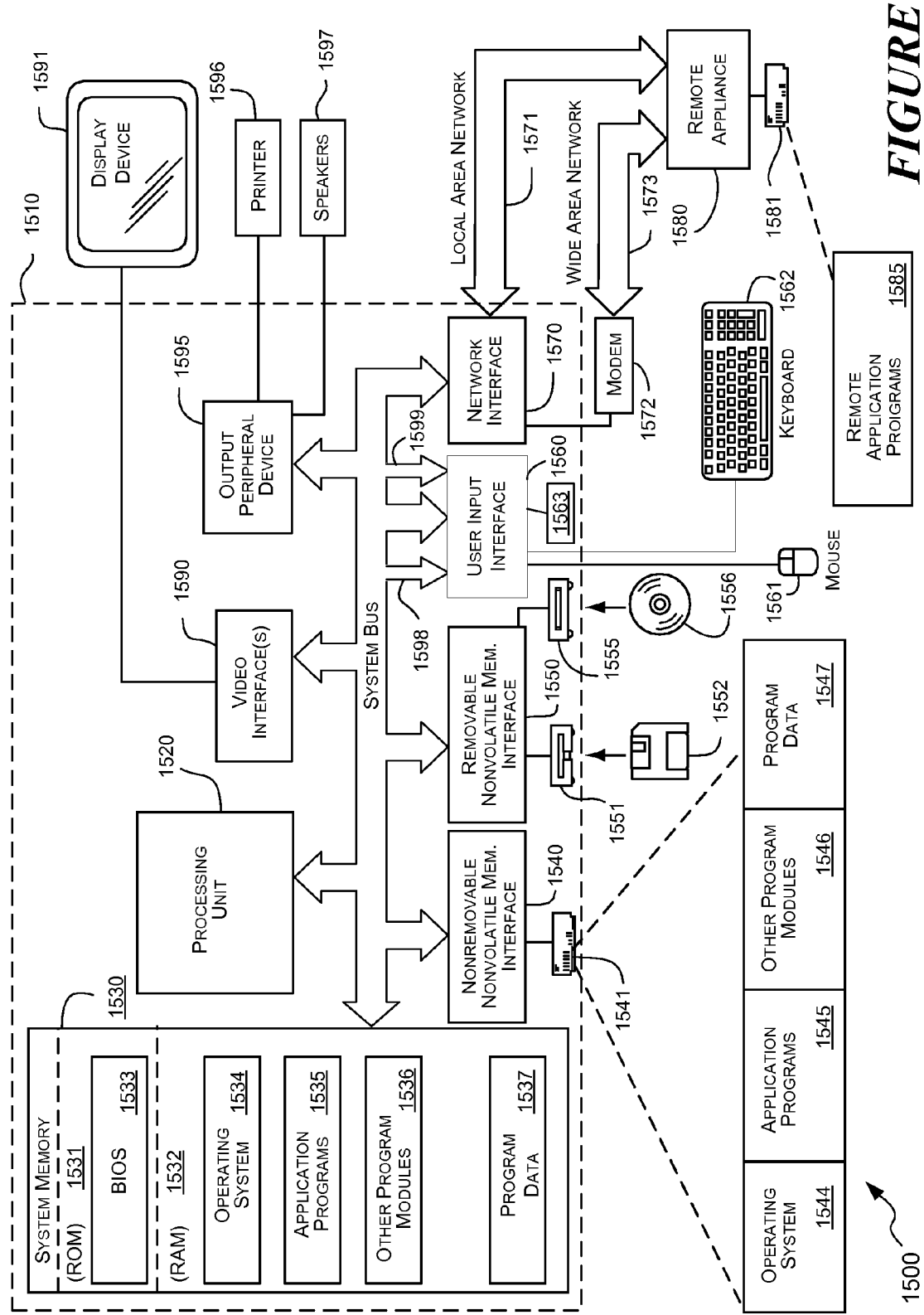
FIG. 15 is a block diagram of a computing-system environment suitable for quantizing context events, scaling probabilistic models, and ordering context events.

FIG. 15 illustrates an exemplary computing system 1500 for implementing embodiments of scalable context quantization. The computing system 1500 is only one example of a suitable operating environment and is not intended to suggest any limitation as to the scope of use or functionality of exemplary embodiments of the scalable context quantization process previously described or other embodiments. Neither should the computing system 1500 be interpreted as having any dependency or requirement relating to any one or combination of components illustrated in the exemplary computing system 1500.

The scalable context quantization process may be described in the general context of computer-executable instructions, such as program modules, being executed on computing system 1500. Generally, program modules include routines, programs, objects, components, data structures, etc., that perform particular tasks or implement particular abstract data types. Moreover, those skilled in the art will appreciate that the scalable context quantization process may be practiced with a variety of computer-system configurations, including hand-held devices, multiprocessor systems, microprocessor-based or programmable-consumer electronics, minicomputers, mainframe computers, and the like. The scalable context quantization process may also be practiced in distributed-computing environments where tasks are performed by remote-processing devices that are linked through a communications network. In a distributed-computing environment, program modules may be located in both local and remote computer-storage media including memory-storage devices.

With reference to FIG. 15, an exemplary computing system 1500 for implementing the scalable context quantization process includes a computer 1510 including a processing unit 1520, a system memory 1530, and a system bus 1521 that couples various system components including the system memory 1530 to the processing unit 1520.

Computer 1510 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1510. The system memory 1530 includes computer-storage media in the form of volatile and/ or nonvolatile memory such as ROM 1531 and RAM 1532. A Basic Input/Output System 1533 (BIOS), containing the basic routines that help to transfer information between elements within computer 1510 (such as during start-up) is typically stored in ROM 1531. RAM 1532 typically contains data and/or program modules that are immediately accessible to and/or presently being operated on by processing unit 1520. By way of example, and not limitation, FIG. 15 illustrates operating system 1534, application programs 1535, other program modules 1536, and program data 1537.

The computer 1510 may also include other removable/nonremovable, volatile/nonvolatile computer-storage media. By way of example only, FIG. 15 illustrates a hard disk drive 1541 that reads from or writes to nonremovable, nonvolatile magnetic media, a magnetic disk drive 1551 that reads from or writes to a removable, nonvolatile magnetic disk 1552, and an optical-disc drive 1555 that reads from or writes to a removable, nonvolatile optical disc 1556 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1541 is typically connected to the system bus 1521 through a nonremovable memory interface such as interface 1540. Magnetic disk drive 1551 and optical dick drive 1555 are typically connected to the system bus 1521 by a removable memory interface, such as interface 1550.

The drives and their associated computer-storage media discussed above and illustrated in FIG. 15 provide storage of computer-readable instructions, data structures, program modules and other data for computer 1510. For example, hard disk drive 1541 is illustrated as storing operating system 1544, application programs 1545, other program modules 1546, and program data 1547. Note that these components can either be the same as or different from operating system 1534, application programs 1535, other program modules 1536, and program data 1537. Typically, the operating system, application programs, and the like that are stored in RAM are portions of the corresponding systems, programs, or data read from hard disk drive 1541, the portions varying in size and scope depending on the functions desired. Operating system 1544, application programs 1545, other program modules 1546, and program data 1547 are given different numbers here to illustrate that, at a minimum, they can be different copies. A user may enter commands and information into the computer 1510 through input devices such as a keyboard 1562; pointing device 1561, commonly referred to as a mouse, trackball or touch pad; a wireless-input-reception component 1563; or a wireless source such as a remote control. Other input devices (not shown) may include a microphone, joystick, game pad, satellite dish, scanner, or the like. These and other input devices are often connected to the processing unit 1520 through a user-input interface 1560 that is coupled to the system bus 1521 but may be connected by other interface and bus structures, such as a parallel port, game port, IEEE 1394 port, or a universal serial bus (USB) 1598, or infrared (IR) bus 1599. As previously mentioned, input/output functions can be facilitated in a distributed manner via a communications network.

A display device 1591 is also connected to the system bus 1521 via an interface, such as a video interface 1590. Display device 1591 can be any device to display the output of computer 1510 not limited to a monitor, an LCD screen, a TFT screen, a flat-panel display, a conventional television, or screen projector. In addition to the display device 1591, computers may also include other peripheral output devices such as speakers 1597 and printer 1596, which may be connected through an output peripheral interface 1595.

The computer 1510 will operate in a networked environment using logical connections to one or more remote computers, such as a remote computer 1580. The remote computer 1580 may be a personal computer, and typically includes many or all of the elements described above relative to the computer 1510, although only a memory storage device 1581 has been illustrated in FIG. 15. The logical connections depicted in FIG. 15 include a local-area network (LAN) 1571 and a wide-area network (WAN) 1573 but may also include other networks, such as connections to a metropolitan-area network (MAN), intranet, or the Internet.

When used in a LAN networking environment, the computer 1510 is connected to the LAN 1571 through a network interface or adapter 1570. When used in a WAN networking environment, the computer 1510 typically includes a modem 1572 or other means for establishing communications over the WAN 1573, such as the Internet. The modem 1572, which may be internal or external, may be connected to the system bus 1521 via the network interface 1570, or other appropriate mechanism. Modem 1572 could be a cable modem, DSL modem, or other broadband device. In a networked environment, program modules depicted relative to the computer 1510, or portions thereof, may be stored in the remote memory storage device. By way of example, and not limitation, FIG. 15 illustrates remote application programs 1585 as residing on memory device 1581. It will be appreciated that the network connections shown are exemplary, and other means of establishing a communications link between the computers may be used.

Although many other internal components of the computer 1510 are not shown, those of ordinary skill in the art will appreciate that such components and the interconnections are well-known. For example, including various expansion cards such as television-tuner cards and network-interface cards within a computer 1510 is conventional. Accordingly, additional details concerning the internal construction of the computer 1510 need not be disclosed in describing exemplary embodiments of the scalable context quantization process.

When the computer 1510 is turned on or reset, the BIOS 1533, which is stored in ROM 1531, instructs the processing unit 1520 to load the operating system, or necessary portion thereof, from the hard disk drive 1541 into the RAM 1532. Once the copied portion of the operating system, designated as operating system 1544, is loaded into RAM 1532, the processing unit 1520 executes the operating system code and causes the visual elements associated with the user interface of the operating system 1534 to be displayed on the display device 1591. Typically, when an application program 1545 is opened by a user, the program code and relevant data are read from the hard disk drive 1541 and the necessary portions are copied into RAM 1532, the copied portion represented herein by reference numeral 1535.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A method for scaling a context model comprising:
identifying a first context model for coding a source at a first bit rate;

identifying a second context model for coding the source at a second bit rate where the second bit rate is higher than the first bit rate; and identifying a plurality of enhancement bits indicating how conditioning states in the first context model are adapted to the second context model, such that the second context model is derivable from the first context model and the enhancement bits.

2. A method of claim 1, wherein each of the context models includes at least one selected conditioning state derived from a context tree model including a plurality of potential conditioning states for N context events, the context tree model including:

i layers where i ranges from 1 to N; and $2^i$ possible conditioning states on each $i^{th}$ layer.

3. A method of claim 2, wherein the second context model includes at least one pair of child conditioning states quantized to a parent conditioning state in the first conditioning state, the parent conditioning state being of a lower order than the child conditioning states.

4. A method of claim 3, further comprising determining whether to quantize the child conditioning states to the parent conditioning state based on a compression gain resulting from quantizing the child conditioning states to the parent conditioning state.

5. A method of claim 4, wherein the compression gain is determined from a conditional entropy of the parent conditioning state and the child conditioning states.

6. A method of claim 5, wherein the compression gain is calculated according to an expression:

$$G(C, C_0, C_1) = I(C) - [I(C_0) + I(C_1)] - \text{Split Cost}$$

where:

G is the compression gain;

C represents the parent conditioning state;

$C_0$ and $C_1$ represent each of the child conditioning states;

Split Cost is a pre-defined value limiting a number of quantized conditioning states; and I is the entropy of a subject conditioning state calculated according to an expression:

$$I(X) = f_1\left(\log \frac{f_1^X + \delta}{f_1^X + f_0^X + \delta}\right) + f_0\left(\log \frac{f_0^X + \delta}{f_1^X + f_0^X + \delta}\right)$$

where:

$f_1^X$ is a number of encoded significant bits;

$f_0^X$ is a number of encoded insignificant bits;

$\delta$ is a constant.

7. A method of claim 1, wherein identifying the enhancement bits includes:

adding a first type of conditioning bit when a first conditioning state in the first context model is replaced by a plurality of higher order child conditioning states in the second context model; and adding a second type of conditioning bit when the first conditioning state in the first context model is not replaced by a plurality of higher order child conditioning states in the second context model.

8. A method of claim 1, wherein the source includes image data transformed using a discrete wavelet transform, further comprising selecting a plurality of context events for coding a pixel value including at least one context event from each of a plurality of bit planes including:

a corresponding pixel in a next more significant bit plane at a lower resolution level;

a corresponding pixel in a current bit plane at a lower resolution level;

a neighboring pixel in a next more significant bit plane at a current resolution level; and a neighboring pixel in a same bit plane at a same resolution level.

9. A method of claim 8, further comprising sequencing the plurality of context events to minimize a conditional entropy of each of the context events.

10. A method of claim 8, further comprising encoding the image data in each of a series of bit planes into which the image data is presented, including:

representing a coefficient in each bit plane with a nonsignificant bit until the coefficient becomes significant in a current bit plane;

representing the coefficient in the bit plane in which the coefficient first becomes significant with a significant bit and a sign bit to represent the sign of the coefficient; and representing the coefficient in any subsequent bit plane with a bit according to the context model for any subsequent bit plane.

11. A computer-readable medium having computer-useable instructions embodied thereon for executing the method of claim 1.

12. A scalable quantizer system for use in one of coding and decoding a source, comprising:

a basic context model including a plurality of conditioning states adapted for coding the source at a lowest anticipated bit rate; and at least one set of enhancement bits indicating how to adapt a plurality of first conditioning states one of included in and derived from a first context model to a plurality of second conditioning states in a second context model where the first context model includes at least one parent conditioning state quantized from a plurality of child conditioning states in the second context model.

13. A system of claim 12, wherein the first context model is adapted for coding the source at a first bit rate and the second context model is adapted for coding the source at a second bit rate, the second bit rate being greater than the first bit rate.

14. A system of claim 12, wherein each of the context models includes at least one selected conditioning state derived from a context tree model including a plurality of potential conditioning states for N context events, the context tree model including:

i layers where i ranges from 1 to N; and $2^i$ possible conditioning states on each $i^{th}$ layer.

15. A system of claim 12, wherein the parent conditioning state is quantized from the child conditioning state based on a compression gain resulting from quantizing the child conditioning states to the parent conditioning state based on a conditional entropy of the parent conditioning state relative to the child conditioning states.

16. A system of claim 12, wherein adapting the first context model to the second context model includes:

identifying a selected enhancement bit among the enhancement bit associated with a selected conditioning state; and one of:

using the selected conditioning state in the second context model when the enhancement bit includes a first type of conditioning bit; and replacing the selected conditioning state in the second context model with a pair of child conditioning states when the enhancement bit includes the second type of conditioning bit.

17. A system for deriving a second context model from a first context model, the system comprising:
- a processing unit;
- a memory operably coupled to the processing unit, the memory having instructions embodied thereon for executing operations comprising:
  - accessing a scalable quantizer including a basic context model at least one set of enhancement bits indicating how conditioning states in the first conditioning states are adapted to form the higher conditioning state;
  - identifying a selected enhancement bit among the enhancement bits associated with a selected conditioning state in the first context model; and one of:
  - using the selected conditioning state in the second context model when the enhancement bit includes a first type of conditioning bit; and
  - replacing the selected conditioning state in the second context model with a pair of child conditioning states when the enhancement bit includes the second type of conditioning bit.

18. A system of claim 17, wherein the first context model includes one of the basic context model and an additional context model derived from the basic context model.

19. A system of claim 17, wherein the selected conditioning state includes one of:
- a first conditioning state included in the first context model; and
- an additional conditioning state generated from the first conditioning state according to at least one of the enhancement bits.

20. A system as recited in claim 17, wherein the first context model is adapted for coding the source at a first bit rate and the second context model is adapted for coding the source at a second bit rate, the second bit rate being greater than the first bit rate.

* * * * *